Patented July 19, 1932

1,867,641

UNITED STATES PATENT OFFICE

GEORGE WITTY, OF NEW YORK, N. Y., ASSIGNOR OF ONE-HALF TO RICHARD T. HARTE, OF NEW YORK, N. Y.

MANUFACTURE OF BRICK

No Drawing.   Application filed November 22, 1929.   Serial No. 409,192.

This invention relates to a process of and materials for the manufacture of brick without the necessity of burning in a kiln, as is necessary with clay products of such character.

A further object is to provide a mixture of materials and process by means of which brick, may be produced in a variety of shapes which are impractical in clay products on account of cracking, chipping, warping and shrinking during the burning process.

Another object of this invention is to produce a brick, made of a blast furnace slag so as to retain the characteristic of lightness accompanied, however, by strength superior to that of the burned clay brick.

In carrying out my process, I use a mixture composed of granulated blast furnace slag, hydraulic cement, pulverized calcium chloride, lead borate and pigments in the following proportions:—granulated blast furnace slag—from 200 to 300 parts by weight, hydraulic cement—from 50 to 100 parts by weight, pulverized calcium chloride—from 3 to 8 parts by weight, lead borate—from 1 to 6 parts by weight, pigments—from 5 to 10 parts by weight, thoroughly mixed in dry state and sufficient water added to form a moistened mass, and pressed into brick tile and the like. After the brick are pressed, they will be placed in a curing tunnel or chamber and treated under steam and moisture at a temperature not less than 75° C. and not over 100° C., for a period of six hours.

As to the pigments employed, I do not limit myself to the particular pigments, since almost any insoluble mineral pigments can be used.

Having thus described my invention, it is obvious that immaterial modifications may be made in the same without departing from the spirit of the invention, hence, I do not wish to be understood as limiting myself to the exact steps or proportions above set forth.

What I claim as new and desire to secure by Letters Patent is:—

1. A blast furnace slag brick consisting of granulated blast furnace slag, cement, calcium chloride, lead borate and a pigment.

2. A blast furnace slag brick consisting of granulated blast furnace slag from two hundred to three hundred parts by weight, cement from fifty to one hundred parts by weight, pulverized calcium chloride from three to eight parts by weight, lead borate from one to six parts by weight and pigments from five to ten parts by weight.

In testimony whereof, I have hereunto signed my name.

GEORGE WITTY.